United States Patent
Froc et al.

(10) Patent No.: US 9,634,789 B2
(45) Date of Patent: Apr. 25, 2017

(54) METHOD AND DEVICE FOR DETERMINING WHETHER A CONFIGURATION OF AN OPTICAL TRANSMISSION INTERFACE HAS TO BE ADJUSTED AND THE CONFIGURING THEREOF

(71) Applicant: MITSUBISHI ELECTRIC CORPORATION, Tokyo (JP)

(72) Inventors: Gwillerm Froc, Rennes (FR); Olivier Weppe, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/778,714

(22) PCT Filed: Feb. 20, 2014

(86) PCT No.: PCT/JP2014/054782
§ 371 (c)(1),
(2) Date: Sep. 21, 2015

(87) PCT Pub. No.: WO2014/148217
PCT Pub. Date: Sep. 25, 2014

(65) Prior Publication Data
US 2016/0056912 A1 Feb. 25, 2016

(30) Foreign Application Priority Data

Mar. 22, 2013 (EP) .................................... 13160675

(51) Int. Cl.
H04J 14/02 (2006.01)
H04L 1/00 (2006.01)
(Continued)

(52) U.S. Cl.
CPC ...... H04J 14/0221 (2013.01); H04B 10/0779 (2013.01); H04B 10/07955 (2013.01);
(Continued)

(58) Field of Classification Search
None
See application file for complete search history.

(56) References Cited

U.S. PATENT DOCUMENTS 6,031,644 A * 2/2000 Utsumi ................ H04B 10/077
372/34
6,847,788 B2 * 1/2005 Nakajima .......... H04B 10/2941
398/149
(Continued)

FOREIGN PATENT DOCUMENTS

EP 1 035 689 A1 9/2000

Primary Examiner — Oommen Jacob
(74) Attorney, Agent, or Firm — Birch, Stewart, Kolasch & Birch, LLP

(57) ABSTRACT

For determining whether a configuration of an optical transmission interface of a first device has to be adjusted for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, a monitoring device performs: monitoring an evolution of a difference level between codewords received by the second device via said optical signals and corresponding codewords transmitted by the first device; and determining whether the configuration of the optical transmission interface of the first device has to be adjusted, on the basis of said monitoring.

7 Claims, 8 Drawing Sheets

Figure 1:
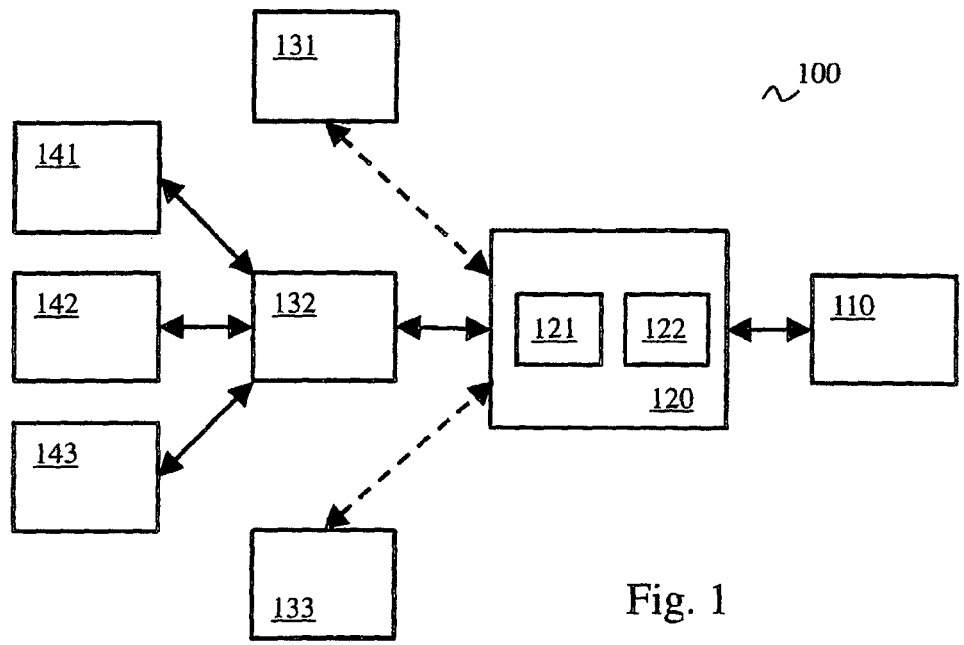

(51) Int. Cl.
*H04J 14/00* (2006.01)
*H04B 10/04* (2006.01)
*H04L 1/20* (2006.01)
*H04B 10/077* (2013.01)
*H04B 10/079* (2013.01)

(52) U.S. Cl.
CPC ..... *H04B 10/07957* (2013.01); *H04L 1/0047* (2013.01); *H04L 1/20* (2013.01); *H04L 1/0057* (2013.01)

(56) References Cited

U.S. PATENT DOCUMENTS

| | | | | |
|---|---|---|---|---|
| 7,149,424 | B2* | 12/2006 | Kamalov | H04B 10/07953 398/147 |
| 8,670,676 | B2* | 3/2014 | Oberland | G02F 1/0123 398/195 |
| 2007/0264024 | A1* | 11/2007 | Zheng | H04B 10/25133 398/147 |
| 2008/0089700 | A1 | 4/2008 | Takahashi | |
| 2008/0222493 | A1 | 9/2008 | Fediakine et al. | |
| 2009/0214200 | A1* | 8/2009 | Webb | H04B 10/677 398/25 |
| 2009/0257748 | A1* | 10/2009 | Nemoto | H04B 10/07957 398/49 |
| 2010/0054750 | A1 | 3/2010 | Forgheri et al. | |
| 2011/0033188 | A1* | 2/2011 | Elbers | H04J 14/02 398/79 |
| 2012/0121257 | A1 | 5/2012 | Tanaka et al. | |
| 2016/0056912 | A1* | 2/2016 | Froc | H04B 10/0779 398/27 |

* cited by examiner

METHOD AND DEVICE FOR DETERMINING WHETHER A CONFIGURATION OF AN OPTICAL TRANSMISSION INTERFACE HAS TO BE ADJUSTED AND THE CONFIGURING THEREOF

The present invention generally relates to optical networks and more particularly to configuring the carrier wavelength to be used by a first device to communicate with a second device, when an optical band-pass filter is present on the path from the first device to the second device.

Optical networks, and more particularly passive optical networks, are increasingly used to give network access to residential or office gateways or to ensure mobile backhauling for instance.

In an attempt to increase the number of users to be served by one access system to the network, wavelength or frequency division multiplexing technologies have been developed. These technologies take advantage of multiplexing several optical signals using different carrier wavelengths or frequencies on a single optical fiber. Even though some user terminals may share the same carrier wavelength or frequency, a wavelength or frequency splitter is typically used to separate the different wavelengths, or frequencies, in order to increase the number of simultaneous optical transmissions. The wavelength or frequency splitter is typically placed between the user terminals and a terminal providing access to the rest of the network. For instance this latter terminal provides access to a core or metropolitan network. Different techniques can be used to achieve the wavelength or frequency splitting. We can cite thin films based systems, interference cavities as AWG (Array Wavelength Gratings) and FBG (Fiber Bragg Gratings).

The wavelength or frequency splitter then comprises several optical band-pass filters, for each direction of communications. It is used to filter and combine optical signals issued by the user terminals toward the terminal giving access to the core or metropolitan network. In the other direction, it is used to filter and spectrally split the optical signals issued by the terminal giving access to the core or metropolitan network.

The difficulty in such an arrangement is to configure the transmission interfaces of the terminals. Indeed, these transmission interfaces shall be configured so that the carrier wavelengths, or frequencies, effectively used substantially match the effective passband of the respective optical band-pass filters with which they are associated.

It is known that such wavelength or frequency splitters are used in a temperature-controlled environment. This allows insuring the stability of the passband of the optical band-pass filters. Otherwise, the passband would vary as a function of the temperature, especially the value of the nominal wavelength or frequency. This known technique however requires that the wavelength or frequency splitters be powered, or to be placed in an environment in which the temperature is controlled (e.g. air conditioned place) or in an athermanous (also referred to as athermal) package. For flexibility in the network deployment, cost and maintenance considerations, it is desirable to get rid of this constraint, which means that the nominal wavelength or frequency of the frequency splitter is a priori unknown.

It can in addition be noticed that the terminals are also subject to similar variations of their transmission configurations, as a function of the temperature, when they are not in such temperature-controlled environments.

It can in addition be noticed that the terminals may also not be aware of the carrier wavelengths effectively used for given configurations of their respective transmission interfaces. Indeed, each terminal uses a set of configuration parameters that may not be indicative of the carrier wavelength effectively used. Modifying this set of configuration parameters involves modifying the carrier wavelength, but with no indication of the effective value of the carrier wavelength.

It is desirable to overcome the aforementioned problems which occur in optical networks. In particular, it is desirable to provide a solution that allows configuring the optical transmission interfaces of devices communicating via an optical band-pass filter for which the effective passband is a priori unknown. It is also desirable to provide a solution that allows configuring the optical transmission interfaces of devices communicating via an optical band-pass filter for which the effective carrier wavelength is temperature dependent and/or the effective passband is temperature dependent, although the width of the passband may not be temperature dependent.

It is also desirable to provide a solution that allows configuring the optical transmission interfaces of devices, communicating via an optical band-pass filter, for which the effective carrier wavelengths for given respective configurations are temperature dependent.

It is furthermore desirable to provide a solution that allows detecting a detuning of the optical transmission interfaces of devices communicating via an optical bandpass filter of flat-top type compared to the effective passband of the optical band-pass filter, and more particularly compared to the nominal wavelength of the optical bandpass filter.

It is furthermore desirable to provide an efficient and cost-effective solution to the aforementioned problems.

To that end, the present invention concerns a monitoring method for determining whether a configuration of an optical transmission interface of a first device has to be adjusted for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown. The monitoring method is such that a monitoring device performs: monitoring an evolution of a difference level between codewords received by the second device via said optical signals and corresponding codewords transmitted by the first device; and determining whether the configuration of the optical transmission interface of the first device has to be adjusted, on the basis of said monitoring.

Thus, although the carrier wavelength and/or the passband of the optical bandpass filter is a priori unknown, it is therefore possible to ensure that the carrier wavelength matches the passband of the optical band-pass filter, thanks to the monitoring of the evolution of the difference level between the codewords received by the second device and the corresponding codewords transmitted by the first device. Detecting of a detuning of the optical transmission interface of the first device is therefore enabled by an analysis of the evolution of said difference level.

According to a particular feature, the monitoring device performs: detecting discontinuities in the evolution of the difference level between said codewords received by the second device and said corresponding codewords transmitted by the first device; extracting a continuous and monotonic evolution of said difference level by removing said discontinuities.

Thus, only the contribution of the temperature change, either at the first device or at the optical band-pass filter, is considered. The impact of impairments on the transmitted codewords, which is not relating to whether the carrier wavelength matches the passband of the optical band-pass filter, is thus not considered for adjusting the carrier wavelength.

According to a particular feature, the monitoring device performs: obtaining a first difference level between first codewords received by the second device and corresponding first codewords transmitted by the first device; obtaining a second difference level between second codewords received by the second device and corresponding second codewords transmitted by the first device; and detecting one said discontinuity when a difference between said first difference level and said second difference level is greater than a first threshold.

Thus, detecting said discontinuities is easy to implement and at low cost.

According to a particular feature, said first and second difference levels respectively correspond to plural difference levels, between codewords received by the second device and corresponding codewords transmitted by the first device, integrated over an integration period.

Thus, artefacts due to measurements for determining the difference levels are smoothed, which is consistent with the slow variations of temperature compared to the reactivity of the monitoring process. Moreover, integrating allows decreasing processing resources consumption.

According to a particular feature, the first and second devices implementing a forward error correction scheme, a refreshing period separating the obtaining of said first difference level and the obtaining of said second difference level, the monitoring device temporarily reduces said refreshing period, when a difference between the second difference level and a decoding limit, which corresponds to the maximum difference level beyond which the second device is unable to recover codewords as transmitted by the first device according to the forward error correction scheme, is below than a second threshold.

Thus, the reactivity for adjusting the optical transmission interface of the first device is increased when needed and the power consumption is reduced the rest of the time.

According to a particular feature, the monitoring device performs: determining an accumulated amount of variation of the difference level; and, determining detuning information representative of a mismatch between the carrier wavelength and the passband of the optical band-pass filter, on the basis of said accumulated amount of variation and of a list of correspondence between detuning information and respective accumulated amounts of variation of the difference level.

Thus, it allows having an instant view of the actual detuning between the carrier wavelength and the passband of the optical band-pass filter, especially when the carrier wavelength is currently under retuning.

According to a particular feature, the monitoring device determines beforehand said list of correspondence between detuning information and respective accumulated amounts of variation of the difference level by analysing signal temporal shapes of codeword symbols received by the second device from the first device via the optical band-pass filter.

The variation of the temporal shape of the signal for one symbol is representative of a variation of group delay, or phase delay also referred to as phase shift, in the transmission of the optical signals via the optical band-pass filter due to a misalignment of the carrier wavelength with the nominal frequency of the optical band-pass filter. The group delay is an indication of the time delay of the amplitude envelope of the sinusoidal components of the symbol through the optical band-pass filter, and is a function of frequency for each component. Phase delay is a similar indication for the time delay of the phase of each sinusoidal component. Thus, by obtaining the information representative of the signal temporal shape for one symbol, the monitoring device is able to determine a wavelength detuning magnitude, even when an optical pass-band filter of flat-top type is used between the first device and the second device.

According to a particular feature, the monitoring device compares said signal temporal shapes with information representative of a set of predefined signal temporal shapes.

Thus, the list of correspondence between detuning information and respective accumulated amounts of variation of the difference level can be easily determined.

According to a particular feature, the monitoring device determines beforehand said list of correspondence between detuning information and respective accumulated amounts of variation of the difference level by: obtaining information representative of signal strength measurements for codewords received by the second device from the first device via the optical band-pass filter, for various carrier wavelengths; obtaining information representative of the difference level between said codewords and expected codewords; trying to match a predefined attenuation model of the optical band-pass filter onto the signal strength measurements; and, determining the list of correspondence between detuning information and respective accumulated amounts of variation of the difference level, on the basis of the matched predefined attenuation model and the obtained difference level between said codewords and expected codewords.

Thus, the list of correspondence between detuning information and respective accumulated amounts of variation of the difference level can be easily determined. This approach is less complex by less accurate than the aforementioned approach based on signal temporal shape.

According to a particular feature, said difference level corresponds to a bit error rate or to an Euclidian distance between said codewords received by the second device and said corresponding codewords transmitted by the first device.

According to a particular feature, the first and second devices implementing a forward error correction scheme, the second device determines said difference level when decoding said received codewords according to said forward error correction scheme.

Thus, determining said difference level is easy to implement and at low cost.

The present invention also concerns a configuring method for configuring an optical transmission interface of a first device for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown. The method is such that a monitoring device performs the aforementioned monitoring method.

The present invention also concerns a monitoring device for determining whether a configuration of an optical transmission interface of a first device has to be adjusted for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown. The monitoring device is such that said monitoring device comprises: means for monitoring an evolution of a difference level between codewords received by the second device via said optical signals and corresponding codewords transmitted by the first device; and means for determining whether the configuration of the optical transmission interface of the first device has to be adjusted, on the basis of said monitoring.

The present invention also concerns a configuring device for configuring an optical transmission interface of a first device for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown. The configuring device is such that said configuring device includes the aforementioned monitoring device.

The present invention also concerns a computer program that can be downloaded from a communication network and/or stored on a medium that can be read by a computer and run by a processor. This computer program comprises instructions for implementing the aforementioned methods in any one of their various embodiments, when said program is run by the processor. The present invention also concerns an information storage means, storing such a computer program.

Figure 2:
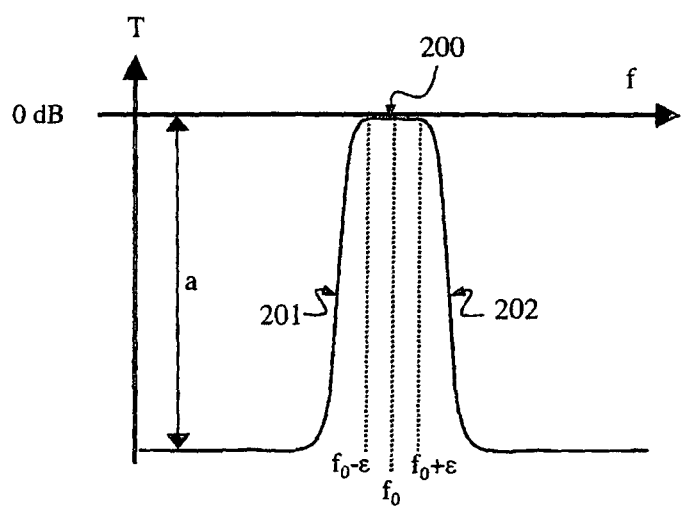
Figure 3:
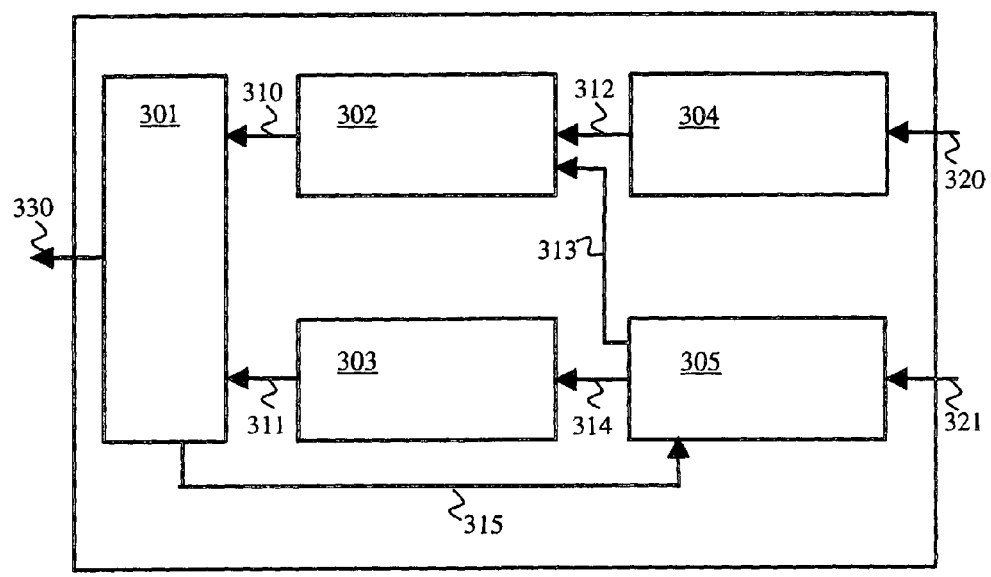
Figure 4:
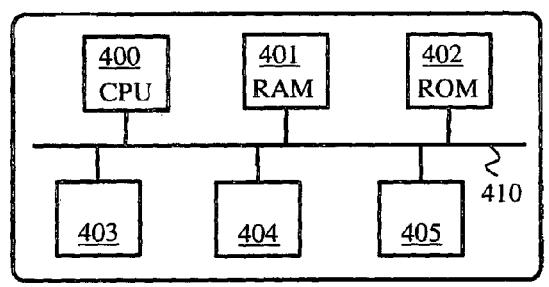
Figure 5:
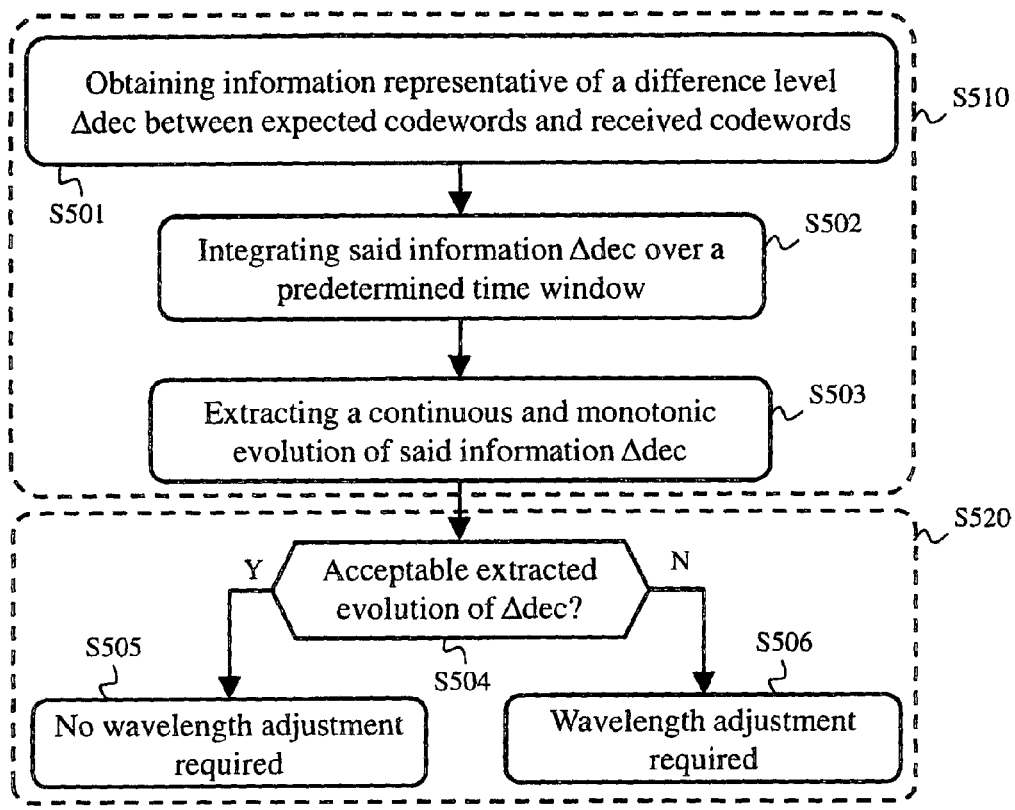
Figure 6:
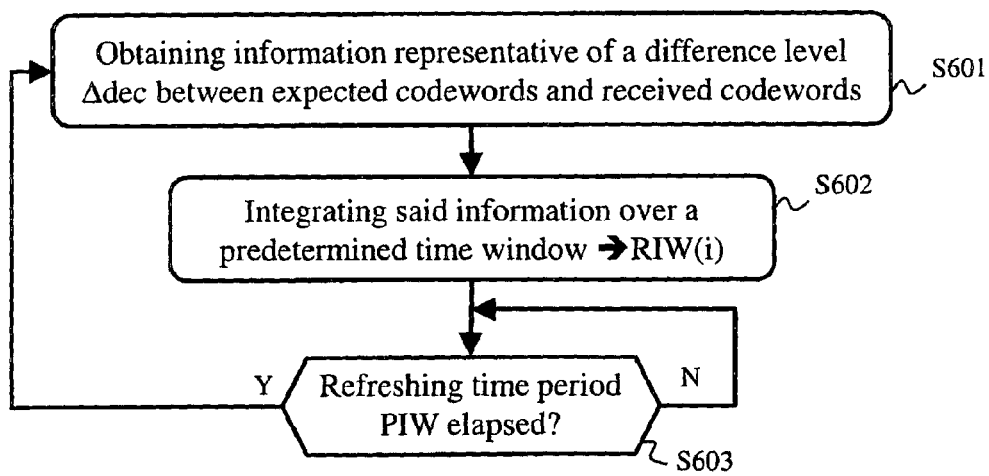
Figure 7:
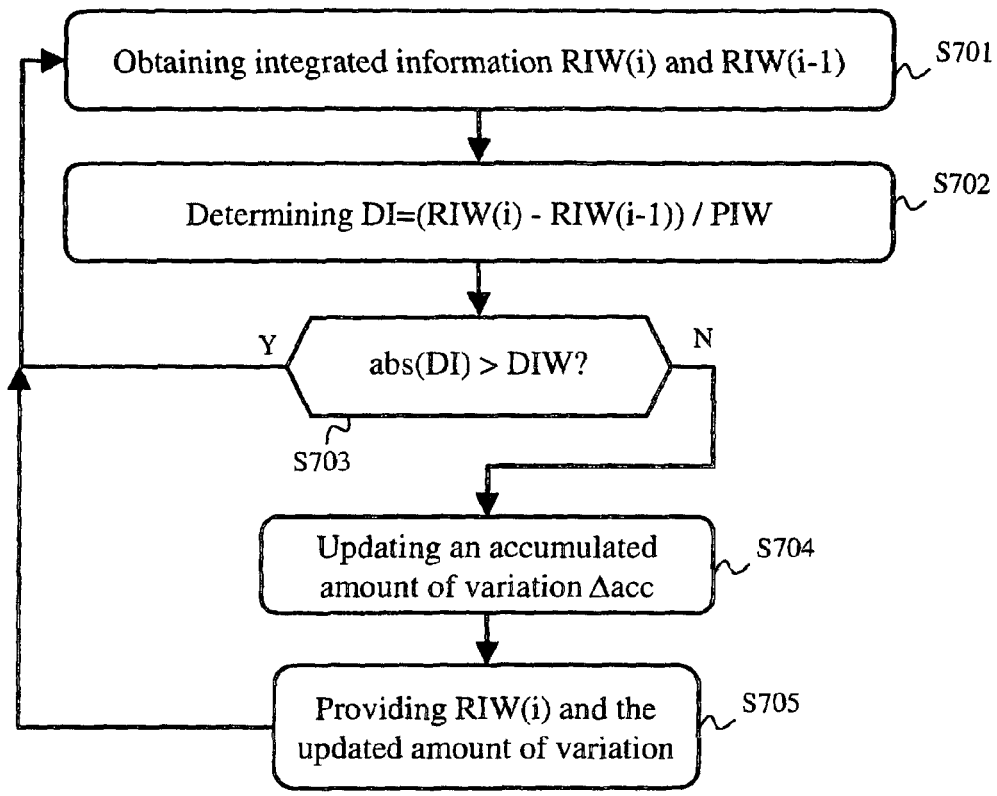
Figure 8:
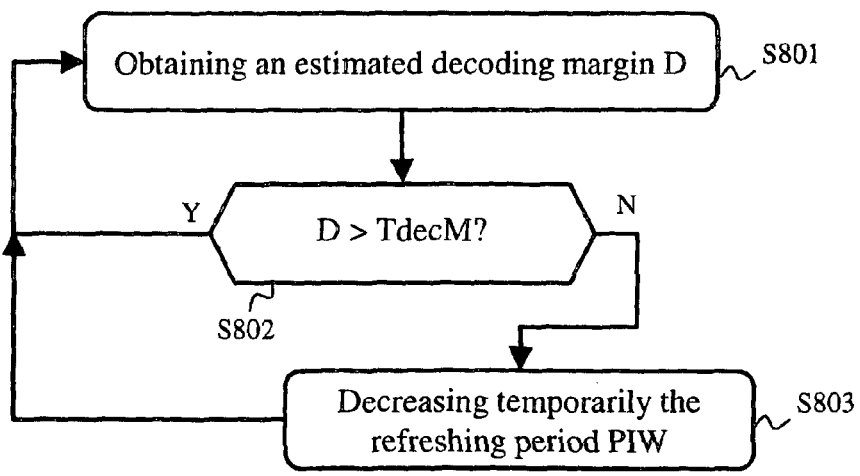
Figure 9:
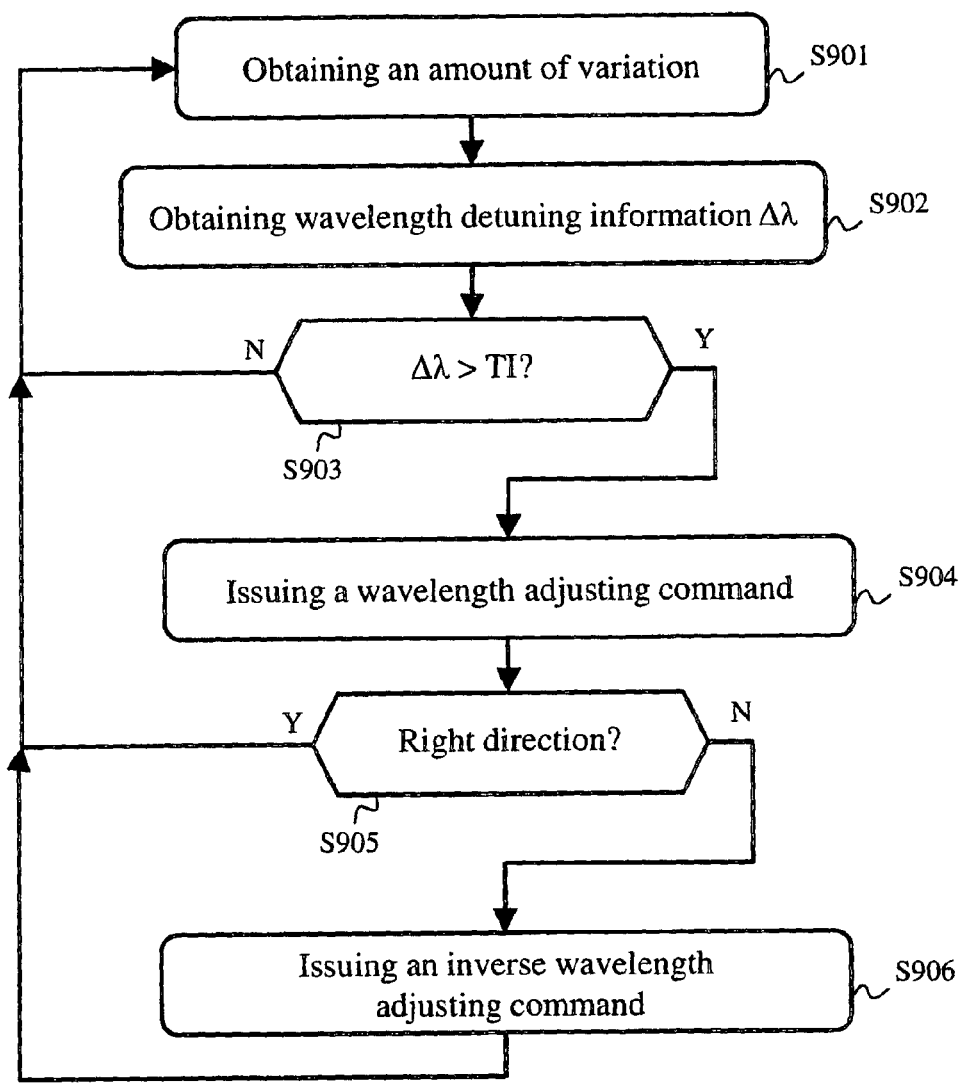
Figure 10:
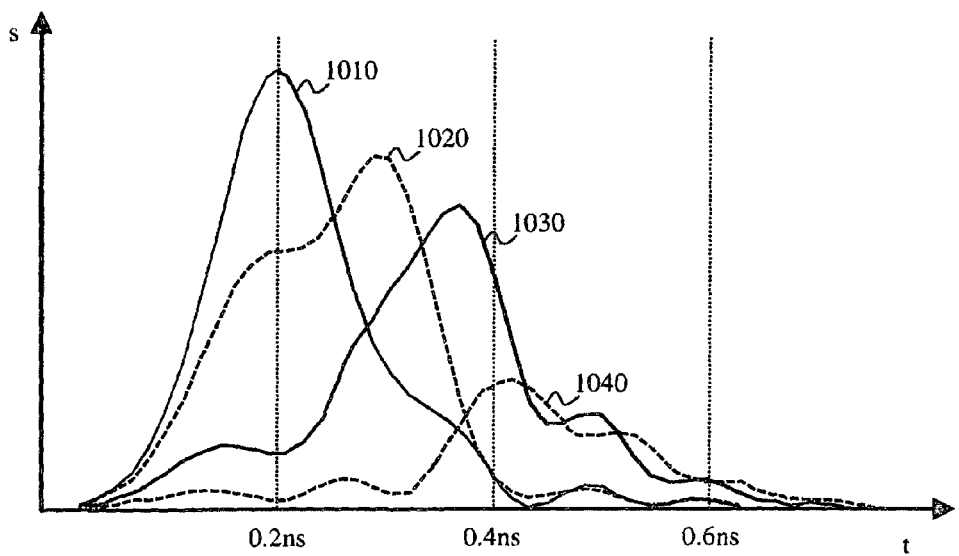
Figure 11:
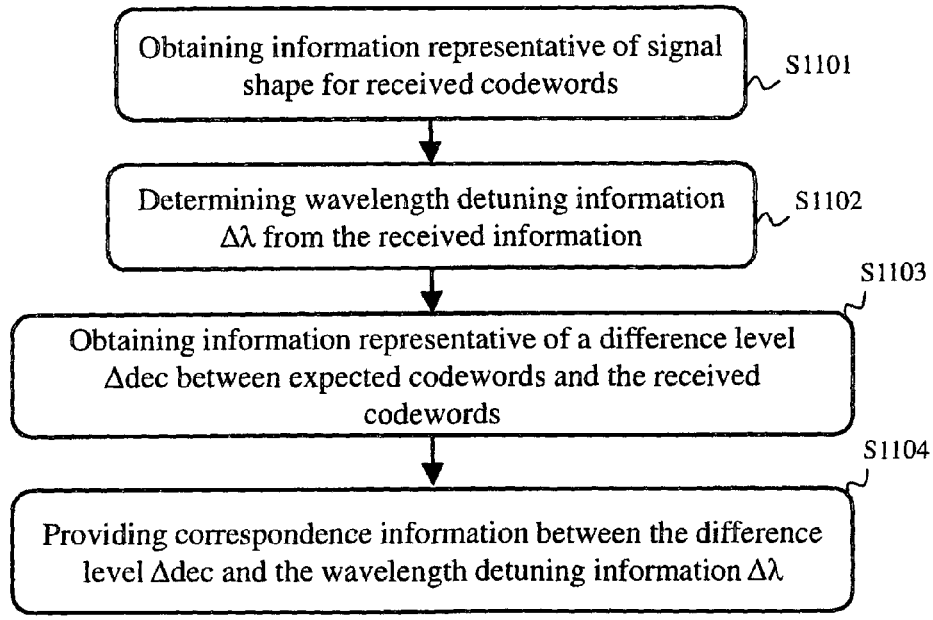
Figure 12:
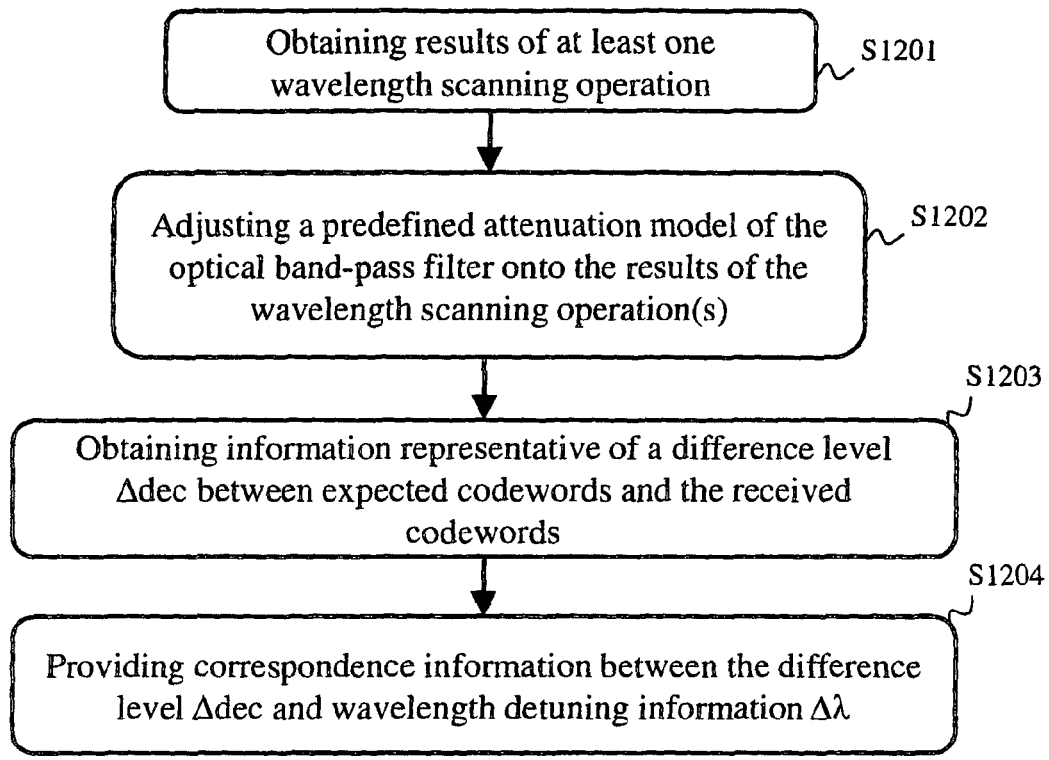
Figure 13A:
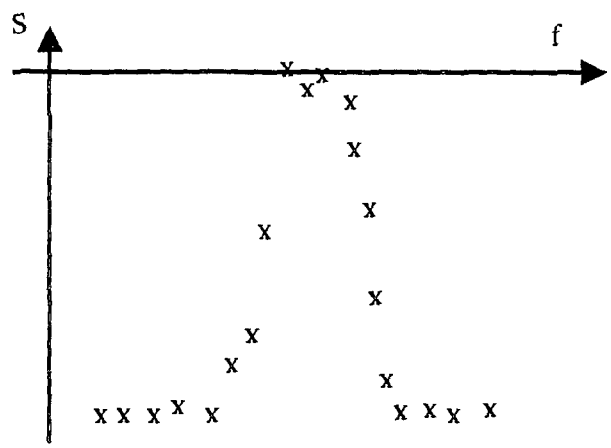
Figure 13B:
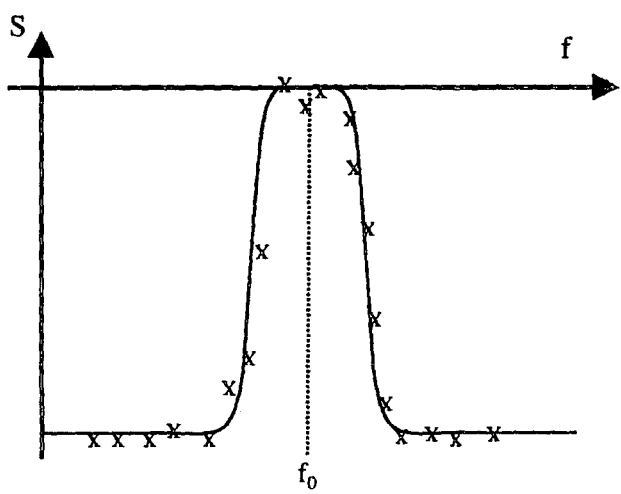

The characteristics of the invention will emerge more clearly from a reading of the following description of an example of embodiment, said description being produced with reference to the accompanying drawings, among which:

FIG. 1 schematically represents an architecture of a passive optical network in which the present invention may be implemented;

FIG. 2 schematically represents a signal attenuation of an optical band-pass filter of the passive optical network;

FIG. 3 schematically represents an architecture of an optical communication device of the passive optical network;

FIG. 4 schematically represents a hardware platform of the optical communication device;

FIG. 5 schematically represents an algorithm for determining whether a configuration of an optical transmission interface of an optical communication device has to be adjusted due to a temperature change;

FIG. 6 schematically represents an algorithm for processing information representative of a difference level between expected codewords and effectively received codewords;

FIG. 7 schematically represents an algorithm for performing bit distance analysis;

FIG. 8 schematically represents an algorithm for adjusting a refreshing time period used for triggering a new processing of the information representative of the difference level between the expected codewords and the effectively received codewords;

FIG. 9 schematically represents an algorithm for instructing the optical communication device to adjust the configuration of said optical transmission interface;

FIG. 10 schematically represents signal temporal shapes corresponding to an impulse response of the optical band-pass filter;

FIG. 11 schematically represents a first algorithm for determining correspondence information between wavelength detuning information and the difference level between expected codewords and effectively received codewords;

FIG. 12 schematically represents a second algorithm for determining correspondence information between wavelength detuning information and the difference level between expected codewords and effectively received codewords;

FIG. 13A schematically represents a result of a wavelength scanning operation;

FIG. 13B schematically represents the result of a wavelength scanning operation, compared to a predefined attenuation model of the optical band-pass filter.

The invention is detailed hereafter in the context of a passive optical network. It has to be however understood that the present invention is not limited to such a context, and may be implemented in the general scope of a transmission of optical signals from a first optical communication device to a second optical communication device via an optical band-pass filter.

It has to be noticed that, since wavelength and frequency are tied together through a direct inverse relationship, these two terms are indifferently used by the one skilled in the art, as they refer to the same concept.

FIG. 1 schematically represents an architecture of a passive optical network 100 in which the present invention may be implemented. The passive optical network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical network 100 are performed by using optical fiber.

In the context of the passive optical network 100, the slave devices 141, 142, 143 are of ONU (Optical Network Units) type. ONUs are typically intended to be located at the end-user household. In the context of the passive optical network 100, the master device 110 is of OLT (Optical Line Terminal) type. It enables ONUs to access a core or metropolitan network (not shown).

The slave devices 141, 142, 143 may be connected to the spectral splitter device 120 via a power splitter device 132. The power splitter device 132 is a passive splitter that separates the input signal, in the downlink direction, into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the OLT. The PONs operate on respective wavelength bands, as filtered by the spectral splitter device 120. To achieve this, the spectral splitter device 120 comprises a pair of optical band-pass filters for each PON, aiming at filtering respective wavelength bands, and thus enabling the spectral splitter device 120 to perform WDM (Wavelength Division Multiplexing).

Therefore, as shown on FIG. 1, the spectral splitter device 120 comprises optical band-pass filters 121 and 122 dedicated to the transmissions over the PON of the power splitter device 132 and its associated slave devices 141, 142, 143. The first filter 122, called hereinafter uplink filter, is in charge of filtering the optical signals in the uplink direction, i.e. from the slave devices 141, 142, 143 to the master device 110. The second filter 121, called hereinafter downlink filter, is in charge of filtering the optical signals in the downlink direction, i.e. from the master device 110 to the slave devices 141, 142, 143. Each filter 121, 122 is an optical band-pass filter defined by a nominal wavelength, also referred to as centre wavelength, as well as a bandwidth or passband.

For a considered uplink or downlink direction, all the filters of the spectral splitter device 120 have preferably the same bandwidth value and are preferably spaced by a fixed spectral distance. However, the nominal wavelengths of the filters, and therefore the effective passband of the filters, are a priori unknown. The spectral splitter device 120 being preferably passive, the nominal wavelengths of the filters, and therefore the effective passband of the filters, may vary as a function of the temperature of the spectral splitter device 120. Typically, for a temperature in a range from −40° C. to 80° C., the nominal wavelength, and therefore the effective passband, may vary by ±0.6 nm for silica-based optical filters, which corresponds to a frequency shift over a frequency band of approximately 200 GHz.

In addition, for the same reasons, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier frequencies that are in the bandwidth or passband of the uplink filter 122. In addition, the master device 110 needs to be configured for transmitting optical signals in the downlink direction on a carrier frequency that is in the bandwidth or passband of the downlink filter 121.

In order to determine whether a configuration of an optical transmission interface of a first device has to be adjusted for transmitting an optical signal to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, the carrier wavelength and/or the passband of the optical band-pass filter being a priori unknown, it is proposed that a monitoring device monitors an evolution of a difference level between codewords received by the second device via said optical signals and corresponding codewords transmitted by the first device, and determines whether the configuration of the optical transmission interface of the first device has to be adjusted, on the basis of said monitoring operation.

The monitoring device may be implemented in the second device, which receives the optical signals. In this case, the second device instructs the first device to reconfigure its optical transmission interface, on the basis of said monitoring operation.

The monitoring device may, in a variant, be implemented in the first device, which transmits the optical signals. In this case, the second device provides the first device with information representative of a difference level $\Delta dec$ between expected codewords and codewords as effectively received by the second device, and the first device determines accordingly whether its optical transmission interface has to be adjusted and performs the adjustment whenever necessary.

The monitoring device may in another variant be implemented in a third device, connected to the first device and second device. In this case, the second device provides the third device with information representative of a difference level $\Delta dec$ between expected codewords and codewords as effectively received by the second device, and the third device determines accordingly whether the optical transmission interface of the first device has to be adjusted and instructs the first device to reconfigure its optical transmission interface.

In the context of the passive optical network 100, the monitoring device may be implemented in the master device 110 for monitoring downlink and uplink optical transmissions. In yet another variant, the monitoring device may be implemented in the slave devices 141, 142, 143 for monitoring downlink and uplink optical transmissions.

FIG. 2 schematically represents a signal attenuation (denoted a on FIG. 2) of an optical band-pass filter of the passive optical network. Frequency is represented as abscissa (horizontal axis) and transmittance (denoted T on FIG. 2) is represented as ordinate (vertical axis).

The passband of the optical band-pass filter is centred at the nominal frequency $f_0$, which is a priori unknown and which may vary as a function of the temperature. FIG. 2 shows a flat top 200 between the low cut-off frequency $f_0-\epsilon$ and the high cut-off frequency $f_0+\epsilon$, the width of the flat top being equal to $2\epsilon$. Between the low cut-off frequency $f_0-\epsilon$ e and the high cut-off frequency $f_0+\epsilon$, it can be considered that no attenuation occurs.

FIG. 2 shows a rising edge 201 for frequencies lower than the low cut-off frequency $f_0-\epsilon$ and a falling edge 202 for frequencies higher than the high cut-off frequency $f_0+\epsilon$. For flat-top filters, the slopes of the rising edge and of the falling edge are abrupt, which means that the attenuation may vary from minimum to maximum within a short frequency range. It is considered that a slope of the rising edge and of the falling edge is abrupt when the absolute value of the slope has a magnitude of at least 500 dB/nm.

Therefore, when a carrier frequency of an optical signal is in the frequency range of the flat-top 200, no attenuation of the signal occurs. But when the carrier frequency of the optical signal is close to the low cut-off frequency $f_0-\epsilon$ or to the high cut-off frequency $f_0+\epsilon$, a slight variation of temperature may imply a slight frequency shift, which then may imply a significant change in the attenuation of the optical signal.

FIG. 3 schematically represents an architecture of the device including the monitoring device.

The monitoring device includes a controller module 301, a detuning determining module 302, a decoding margin estimating module 303 and a bit distance analysing module 305.

The controller module 301 is adapted to receive via a link 310 detuning information $\Delta\lambda$ from the detuning determining module 302, which may be built on the basis of at least one look-up table (LUT).

The controller module 301 is further adapted to receive via a link 311 decoding margin information from the decoding margin estimating module 303.

The controller module 301 is further adapted to transmit wavelength adjusting commands to the first device, instructing the first device to adjust accordingly the configuration of the optical transmission interface of the first device, as detailed hereafter with regard to FIG. 9. The controller module 301 is further adapted to generate the wavelength adjusting commands, on the basis of the detuning information $\Delta\lambda$ provided by the detuning determining module 302.

The controller module 301 may be further adapted to transmit, via a link 315, refreshing period adjusting commands to the bit distance analysing module 305, instructing the bit distance analysing module 305 to adjust accordingly a refreshing time period which defines the time period between two successive analysis by the bit distance analysing module 305 of a difference level $\Delta dec$ between codewords transmitted by the first device and corresponding codewords effectively received by the second device. The controller module 301 is further adapted to generate the refreshing period adjusting commands, on the basis of the decoding margin information provided by the decoding margin estimating module 303.

The bit distance analysing module 305 is adapted to receive, via a link 321, information representative, for codewords received by the second device from the first device, of the difference level $\Delta dec$ between said codewords as transmitted by the first device and the corresponding codewords as effectively received by the second device.

The difference level $\Delta dec$ is for instance expressed as an Euclidian distance between the transmitted codeword and the received codeword. Results of soft decoding can be used to do so. The difference level $\Delta dec$ may also be expressed as a bit error rate (BER), or as any metric representative of the difficulty encountered by the second device to recover the transmitted codewords.

For the sake of simplicity, the analysis of the difference level $\Delta dec$ is called herein bit distance analysis, although the monitoring device may process another metric representative of the difficulty encountered by the second device to recover the transmitted codewords than the bit distance.

In a preferred embodiment, the first and second devices implement Forward Error Correction (FEC), for instance using a Reed-Solomon error-correcting code or a Low-Density Parity-Check (LDPC) code. The difference level $\Delta dec$ is thus representative of the difference magnitude between codewords received by the second device and the corresponding codewords decoded by the second device thanks to the FEC code. It is a representation of the reliability of the received codewords.

In another embodiment, the first device transmits to the second device predefined codewords known by the second device, for instance in a predefined time period that may be part of a periodic frame. Therefore, without implementing soft-coding, the second device is able to determine information representative of the difference level between the expected codewords and the effectively received codewords, whichever said information is a bit error rate or an Euclidian distance between the transmitted codeword and the received codeword, or any metric representative of the difficulty encountered by the second device to recover the transmitted codewords.

The information representative of the difference level $\Delta dec$ is provided by the second device via the link 321, preferably when FEC-decoding of the codewords to which said difference level $\Delta dec$ refers. The information representative of the difference level $\Delta dec$ may be determined once the FEC-decoding is performed, or be based on intermediary results of the FEC-decoding with a confidence level.

The bit distance analysing module 305 is further adapted to analyse the received difference level $\Delta dec$, as detailed hereafter with regard to FIGS. 6 and 7. The bit distance analysing module 305 is further adapted to provide, to the detuning determining module 302 via a link 313, information representative of an accumulated amount of variation $\Delta acc$ of the difference level $\Delta dec$, resulting from the analysis of the received difference level $\Delta dec$. The bit distance analysing module 305 is further adapted to provide, to the decoding margin estimating module 303 via a link 314, information representative of the received difference level $\Delta dec$ over a predetermined integration period. The bit distance analysing module 305 may further be adapted to receive refreshing period adjusting commands from the controller module 301 and to accordingly adjust the aforementioned refreshing time period, as detailed hereafter with regard to FIG. 8.

The detuning determining module 302 is adapted to determine a correspondence between the information representative of the accumulated amount of variation $\Delta acc$ of the difference level $\Delta dec$, as provided by the bit distance analysing module 305, and the aforementioned detuning information $\Delta\lambda$ to be provided by the detuning determining module 302 to the controller module 301.

The decoding margin estimating module 303 is adapted to determine whether the information representative of the received difference level $\Delta dec$ over the predetermined integration period, as provided by the bit distance analysing module 305, indicates that the second device is about to reach a decoding limit Tdec, which corresponds to the maximum difference level beyond which the second device is unable to recover the codewords as transmitted by the first device. The decoding margin estimating module 303 is further adapted to accordingly provide the aforementioned decoding margin information to the controller module 301.

The monitoring device may further include a signal shape analysing module 304, which is in charge of populating, via a link 312, the correspondence information in the detuning determining module 302, e.g. populating beforehand the LUT. The signal shape analysing module 304 is adapted to analyse shapes of received optical signals in order to estimate correspondence information between detuning magnitude and the difference level $\Delta dec$ between expected codewords and effectively received codewords. The signal shape analysing module 304 is adapted to receive signal shape information via a link 320, as well as information representative of said difference level $\Delta dec$ for the codewords corresponding to said signal shape.

The signal shape analysing module 304 may be replaced by an attenuation analysing module adapted to analyse optical signal attenuation during wavelength scanning operations, as detailed hereafter with regard to FIG. 12, in order to estimate correspondence information between detuning magnitude and the difference level $\Delta dec$ between expected codewords and effectively received codewords. The attenuation analysing module is adapted to receive signal strength measurements information via the link 320, as well as information representative of said difference level $\Delta dec$ for the codewords corresponding to said signal strength measurements.

FIG. 4 schematically represents a hardware platform of the device including the monitoring device. For instance, it is considered that the master device 110 includes the monitoring device.

According to the shown hardware platform, the master device 110 comprises the following components interconnected by a communications bus 410: a processor, microprocessor, microcontroller or CPU (Central Processing Unit) 400; a RAM (Random-Access Memory) 401; a ROM (Read-Only Memory) 402; a device 403 adapted to read information stored on storage means; a first communication interface 404, aiming at being connected to the spectral splitter device 120 for transmitting and receiving optical signals; and, a second communication interface 405, aiming at being connected to the core or metropolitan network.

CPU 400 is capable of executing instructions loaded into RAM 401 from ROM 402 or from any other storage means. After the master device 110 has been powered on, CPU 400 is capable of reading instructions from RAM 401 and executing these instructions. The instructions form one computer program that causes CPU 400 to perform some or all of the steps of the algorithms described hereafter, and/or to implement the modules described hereinbefore with regard to FIG. 3.

It can be noted that the slave devices 141, 142, 143 may also be implemented on the basis of the hardware platform schematically shown on FIG. 4, except that the communication interfaces are adapted to allow the concerned slave device to communicate with the relevant devices of the passive optical network 100.

Any and all steps of the algorithms described herein, as well as the architecture shown on FIG. 3, may be implemented in software by execution of a set of instructions or program by a programmable computing machine, such as a DSP (Digital Signal Processor) or a microcontroller; or else be implemented in hardware by a machine or a dedicated component, such as an FPGA (Field-Programmable Gate Array) or an ASIC (Application-Specific Integrated Circuit).

FIG. 5 schematically represents an algorithm for determining whether the configuration of the optical transmission interface of the first device has to be adjusted due to a temperature change.

In order to determine whether there is a mismatch between the carrier wavelength used by the first device to transmit optical signals to the second device and the passband of the optical band-pass filter present between the first device and the second device, the monitoring device monitors, in a step S510, the evolution of the difference level $\Delta dec$ between codewords received by the second device via said optical signals and corresponding codewords transmitted by the first device. Then, in a step S520, the monitoring device determines whether the configuration of the optical transmission interface of the first device has to be adjusted, on the basis of said monitoring.

FIG. 5 shows a detailed embodiment of the steps S510 and S520. More particularly, when the optical path between the first and second devices is subject to impairments, the monitoring device discriminates a part of the difference level $\Delta dec$ evolution due to temperature variations and a part of the difference level $\Delta dec$ evolution due to said impairments. Indeed, in case of such impairments, the contribution of said impairments in the evolution of said difference level $\Delta dec$ shall not be confused with the contribution of the mismatch between the carrier wavelength and the passband of the optical band-pass filter in the evolution of said difference level $\Delta dec$, since adjusting the carrier wavelength would not help resolving decoding issues related to such impairments.

In a step S501, the monitoring device obtains, from the second device, information representative of a difference level $\Delta dec$ between codewords as transmitted by the first device and corresponding codewords as effectively received by the second device. The monitoring device thus obtains said information representative of a difference level $\Delta dec$ for plural codewords received by the second device.

In a following step S502, the monitoring device integrates, over a predetermined integration period, said information representative of a difference level $\Delta dec$. Said predetermined integration period is herein simply called integration period. In other words, the monitoring device obtains a mean difference level from the received information representative of the difference level $\Delta dec$ for said plural codewords. The integration period may be a default value, for instance empirically defined, or defined according to the modulation scheme used for the optical transmissions from the first device to the second device, from which the codewords related to the integrated information are issued.

In a following step S503, the monitoring device extracts a continuous and monotonic evolution of the difference level $\Delta dec$ over plural integration periods. In other words, the monitoring device removes discontinuities in the evolution of the difference level $\Delta dec$. Indeed, when the temperature evolves and modifies the matching of the configuration of the optical transmission interface of the first device with the passband of the optical band-pass filter placed between the first device and the second device, the evolution of the impact of this temperature change on the difference level $\Delta dec$ is expected to be continuous and monotonic. On the contrary, sudden impairments are expected to show discontinuities in the evolution of the difference level $\Delta dec$. The extracted continuous and monotonic evolution of the difference level $\Delta dec$ over plural integration periods is therefore representative of the possible mismatch, due to a temperature change, between the configuration of the optical transmission interface of the first device and the passband of said optical bandpass filter. The extraction of said continuous and monotonic evolution of the difference level $\Delta dec$ ends the step S510.

In a following step S504, the monitoring device checks whether the extracted evolution of the difference level $\Delta dec$ is acceptable according to at least one predefined criteria. Such a predefined criteria is for example, when said evolution is representative of a stable, or improving, difference level $\Delta dec$, for the monitoring device to consider that the extracted evolution of the difference level $\Delta dec$ is acceptable. Fulfillment of such a criteria may be evaluated using the derivative according to time of the difference level $\Delta dec$. According to another example, such a predefined criteria is, when an accumulated difference level $\Delta acc$ is above a certain threshold, for the monitoring device to consider that the extracted evolution of the difference level $\Delta dec$ is not acceptable. Such an accumulated difference level $\Delta acc$ is detailed hereafter with regard to FIGS. 7 and 9. According to another example, such a criteria is when the evolution of the difference level $\Delta dec$ shows a change greater than the tuning granularity of the carrier wavelength by the optical transmission interface of the first device.

When the monitoring device considers that the extracted evolution of the difference level $\Delta dec$ is acceptable, a step S505 is performed; otherwise, a step S506 is performed.

In the step S505, the monitoring device determines that the configuration of the optical transmission interface of the first device doesn't need to be adjusted.

In the step S506, the monitoring device determines that the configuration of the optical transmission interface of the first device needs to be adjusted. The monitoring device may determine the extent to which the configuration of the optical transmission interface of the first device needs to be adjusted thanks to the aforementioned accumulated difference level Δacc.

Following the step S506, the monitoring device instructs the first device to adjust the configuration of its optical transmission interface. This aspect is detailed hereafter with regard to FIG. 9. When the monitoring device instructs the first device to effectively adjust the configuration of its optical transmission interface, the monitoring device is referred herein to as configuring device.

A detailed implementation of at least one embodiment of the aforementioned monitoring step is provided hereafter with regard to FIGS. 6 to 9.

FIG. 6 schematically represents an algorithm for processing the information representative of the difference level Δdec between expected codewords and codewords effectively received by the second device.

In a step S601, the monitoring device obtains, from the second device, information representative of a difference level Δdec between codewords as transmitted by the first device and corresponding codewords as effectively received by the second device. The monitoring device thus obtains said information representative of a difference level Δdec for plural codewords received by the second device. The step S601 corresponds to the already-described step S501.

In a following step S602, the monitoring device integrates, over a predetermined integration period, said information representative of a difference level Δdec. The step S602 corresponds to the already-described step S502. For the sake of simplicity, the result of the integration over the predetermined period i is denoted RIW(i), wherein i is a positive integer index.

In a following step S603, the monitoring device checks whether a refreshing time period, denoted PIW, has elapsed. The refreshing time period PIW may be adjusted, as detailed hereafter with regard to FIG. 8. The refreshing time period corresponds to the time period between two successive collections of the information representative of the difference level Δdec between expected codewords and codewords effectively received by the second device.

When the refreshing time period has not elapsed, the step S603 is repeated; otherwise, the step S601 is repeated and the monitoring device collects new information representative of the difference level Δdec between expected codewords and codewords effectively received by the second device, and a new integration is subsequently performed.

Therefore, the algorithm of FIG. 6 aims at obtaining from the second device the necessary information, and further formatting or pre-processing said necessary information, for performing the bit distance analysis. In the context of the architecture shown on FIG. 3, the algorithm of FIG. 6 is performed by the bit distance analysing module 305.

FIG. 7 schematically represents an algorithm for performing the bit distance analysis.

In a step S701, the monitoring device obtains integrated information RIW(i−1) and RIW(i) for two successive integration periods, as already detailed with regard to FIG. 6.

In a following step S702, the monitoring device determines a value DI as follows:

$$DI=(RIW(i)-RIW(i-1))/PIW$$

The value DI is representative of whether a discontinuity occurred in the evolution of the difference level Δdec between expected codewords and codewords effectively received by the second device.

In a following step S703, the monitoring device checks whether the absolute value of DI is greater than a predetermined threshold DIW. The predetermined threshold DIW may be empirically defined or set at a default value that depends on the modulation scheme used for the optical transmissions from the first device to the second device, from which the codewords related to the integrated information RIW(i) are issued.

When the absolute value of DI is greater than the predetermined threshold DIW, which means that a discontinuity is detected in the evolution of the difference level Δdec, the step S701 is repeated; otherwise, a step S704 is performed.

It has to be noticed that, when the refreshing period PIW is fixed, the value DI may be determined as follows:

$$DI=RIW(i)-RIW(i-1)$$

In this case, the value of the predetermined threshold DIW is set in accordance.

In the step S704, the monitoring device updates an accumulated amount of variation Δacc corresponding to the variation of the difference level Δdec for what concerns the contribution of the temperature change. For the first integrated information RIW(0), the accumulated amount of variation Δacc is set to 0. The accumulated amount of variation Δacc is updated by adding the signed result of the subtraction RIW(i)−RIW(i−1) to the previous value of Δacc.

In a following step S705, the monitoring device provides the integrated information RIW(i) for determining the already-mentioned decoding margin information. The monitoring device further provides the accumulated amount of variation Δacc for determining the already-mentioned detuning information Δλ.

Therefore, the algorithm of FIG. 7 aims at performing the bit distance analysis, and in this context, removing the discontinuities observed in the evolution of the difference level Δdec between expected codewords and codewords effectively received by the second device. In the context of the architecture shown on FIG. 3, the algorithm of FIG. 7 is performed by the bit distance analysing module 305, which provides the accumulated amount of variation Δacc to the detuning determining module 302 and which provides the integrated information RIW(i) to the decoding margin estimating module 303.

FIG. 8 schematically represents an algorithm for adjusting the refreshing time period. As already mentioned, the refreshing time period may be fixed or may be adjusted.

In a step S801, the monitoring device obtains an estimated decoding margin D from the integrated information RIW(i) and from the already-mentioned decoding limit Tdec. The decoding limit Tdec may be empirically defined, or defined according to the decoding scheme used in the optical transmissions, from the first device to the second device, from which the codewords related to the integrated information RIW(i) are issued. The decoding margin D corresponds to the difference between the integrated information RIW(i) and the decoding limit Tdec.

In the context of the architecture shown on FIG. 3, the decoding margin D is estimated by the decoding margin estimating module 303 and further provided by the decoding margin estimating module 303 to the controller module 301.

In a following step S802, the monitoring device checks whether the decoding margin D is greater than a predetermined threshold TdecM. When the decoding margin D is greater than the predetermined threshold TdecM, the step S801 is repeated; otherwise, a step S803 is performed.

In the step S803, the monitoring device temporarily decreases the refreshing time period PIW. The step S801 is then repeated.

Therefore, the algorithm of FIG. 8 aims at adapting the reactivity of the carrier wavelength adjustments in view of the remaining margin for the second device compared to the decoding capability of the second device. It allows defining a tradeoff between reactivity and power consumption. In the context of the architecture shown on FIG. 3, the algorithm of FIG. 8 is performed by the controller module 301, which provides refreshing period adjusting commands to the bit distance analysing module 303.

FIG. 9 schematically represents an algorithm for instructing the first device to adjust the configuration of the optical transmission interface of said first device.

In a step S901, the monitoring device obtains the aforementioned accumulated amount of variations $\Delta acc$.

In the context of the architecture shown on FIG. 3, the aforementioned accumulated amount of variations $\Delta acc$ is determined by the detuning determining module 302 and further provided by the detuning determining module 302 to the controller module 301.

In a following step S902, the monitoring device obtains the already-mentioned detuning information $\Delta\lambda$ from the obtained accumulated amount of variations $\Delta acc$ and from information of correspondence between a set of detuning information and a set of respective accumulated amount of variations. As already mentioned, said correspondence between a set of detuning information and a set of respective accumulated amount of variations may be implemented in a LUT, and such a LUT may be populated as detailed hereafter with regard to FIGS. 10 and 11 in a first embodiment, or with regard to FIGS. 12, 13A and 13B in a second embodiment.

In a following step S903, the monitoring device checks whether the detuning information $\Delta\lambda$ is greater than a predetermined threshold TI.

The predetermined threshold TI may be a default value, for instance empirically defined, or defined according to the modulation scheme and/or the FEC scheme used for the optical transmissions from the first device to the second device, from which the codewords related to the obtained accumulated amount of variations $\Delta acc$ are issued.

When the detuning information $\Delta\lambda$, is greater than the predetermined threshold TI, a step S904 is performed; otherwise, the step S901 is repeated.

In the step S904, the monitoring device transmits to the first device at least one wavelength adjusting command. The first device consequently adjusts the configuration of the optical transmission interface of said first device. The carrier wavelength used in the optical transmissions from the first device to the second device is therefore modified.

As the monitoring device may not be aware whether the carrier wavelength should be increased or decreased, the monitoring device may indicate a default direction in which the carrier frequency should be tuned. Then, once the first device has modified the configuration of its optical transmission interface, the monitoring device checks whether the subsequent evolution of the difference level $\Delta dec$ shows an adjustment in the appropriate direction. If not, the monitoring device instructs the first device to adjust the configuration of its optical transmission interface in the other direction. This aspect is detailed hereafter with regard to steps S905 and S906.

In the step S905, the monitoring device checks whether the transmitted wavelength adjusting command(s) impacted the evolution of the difference level $\Delta dec$ in the right direction. When the transmitted wavelength adjusting command(s) impacted the evolution of the difference level $\Delta dec$ in the right direction, the step S901 is repeated; otherwise, the step S906 is performed.

In the step S906, the monitoring device transmits to the first device at least one inverse wavelength adjusting command, aiming at cancelling the impact of the wavelength adjusting command(s) transmitted in the step S904 and at further adjusting the carrier wavelength according to the detuning information $\Delta\lambda$.

In a particular embodiment, when the monitoring device is not aware whether the carrier wavelength should be increased or decreased, the monitoring device requests firstly a partial adjustment of the configuration of the optical transmission interface of the first device. Then, according to the subsequent evolution of the difference level $\Delta dec$, the monitoring device requests a complete adjustment of the configuration of the optical transmission interface of the first device, or a corrected adjustment of the configuration of the optical transmission interface of the first device in the other direction.

Therefore, the algorithm of FIG. 9 aims at requesting the first device to adapt its optical transmission interface so that the carrier wavelength better matches the passband of the optical band-pass filter present on the optical path from the first device to the second device. The evolution of the difference level $\Delta dec$ between expected codewords and effectively received codewords allows deriving the detuning information $\Delta\lambda$. In the context of the architecture shown on FIG. 3, the algorithm of FIG. 9 is performed by the controller module 301, which provides wavelength adjusting commands to the first device.

FIG. 10 schematically represents signal temporal shapes of an impulse response of the optical band-pass filter present on the optical path from the first device to the second device. Time is represented as abscissa (horizontal axis) and signal strength is represented as ordinate (vertical axis).

Let's consider an optical band-pass filter having the following characteristics: an attenuation of 0.1 dB at 10 GHz, an attenuation of 3 dB at 7.5 GHz and 12.5 GHz, and slopes of 850 dB/nm beyond these values.

The shape 1010 represents the signal temporal shape of the impulse response of the optical band-pass filter, when the carrier frequency of the optical signal matches the nominal frequency $f_0$ of the optical band-pass filter. The shape 1010 shows an extreme around 0.2 ns from the beginning of the reception of the symbol.

The shape 1020 represents the signal temporal shape of the impulse response of the optical band-pass filter, when the frequency shift between the carrier frequency of the optical signal and the nominal frequency $f_0$ of the optical band-pass filter equals to 2 GHz. The shape 1020 shows an extreme around 0.3 ns from the beginning of the reception of the symbol.

The shape 1030 represents the signal temporal shape of the impulse response of the optical band-pass filter, when the frequency shift between the carrier frequency of the optical signal and the nominal frequency $f_0$ of the optical band-pass filter equals to 4 GHz. The shape 1030 shows an extreme around 0.35 ns from the beginning of the reception of the symbol.

The shape 1040 represents the signal temporal shape of the impulse response of the optical band-pass filter, when the frequency shift between the carrier frequency of the optical signal and the nominal frequency $f_0$ of the optical band-pass filter equals to 6 GHz. The shape 1040 shows an extreme around 0.4 ns from the beginning of the reception of the symbol.

The shapes 1010, 1020, 1030 and 1040 show extremes, which are maximum signal strength, around respectively 0.3 ns, 0.35 ns and 0.4 ns. Other shapes may be obtained, for instance according to the waveform of the signal transmitted via the optical band-pass filter.

Such shapes may present more extremes, also referred to as local extremes, as shown for instance in shapes 1030 and 1040.

It can then be understood that the signal temporal shape varies with the frequency detuning between the carrier frequency of the optical signal and the nominal frequency $f_0$ of the optical band-pass filter.

FIG. 11 schematically represents a first algorithm for determining correspondence information between the wavelength detuning information $\Delta\lambda$, and the difference level $\Delta$dec between expected codewords and effectively received codewords.

In a step S1101, the monitoring device obtains, from the second device, information representative of signal shape of codewords received by the second device from the first device via the optical band-pass filter.

In one embodiment, the monitoring device obtains measurements of the signal strength of the optical signal, received by the second device, from the first device via the optical band-pass filter, at plural instants in the duration of the considered symbol.

In order to obtain measurements of the signal strength at plural instants in the duration of the symbol, the second device performs oversampling.

In a variant, the first device successively transmits to the second device plural copies of the symbol, each copy being delayed from the preceding copy by a submultiple of the symbol duration. This delay can be achieved by using delay lines. Then, the second device performs sampling of the plural copies and the second device performs one measurement of signal strength for each copy of the symbol, according to its sampling frequency. According to this arrangement, the time period between the beginning of the transmission of a copy and the beginning of the transmission of the immediately following copy equals to a symbol duration increased by said submultiple of the symbol duration. Therefore, the second device samples the copies of a same symbol at different instants and therefore catches the signal strength at different instants, which allows obtaining a discrete view of the signal temporal shape for the symbol without using oversampling. The second device then generates information representative of the signal temporal shape from the sampling of the plural copies.

In another variant, the first device successively transmits to the second device plural copies of the symbol. Then, the second device performs sampling of the plural copies, each sampling operation for one copy being delayed compared to the sampling operation of a preceding copy by a submultiple of the symbol duration. This delay can be achieved by using delay lines. According to this arrangement too, the second device samples the copies of a same symbol at different instants and therefore catches the signal strength at different instants, which allows obtaining a discrete view of the signal temporal shape for the symbol without using oversampling. The second device then generates information representative of the signal temporal shape from the sampling of the plural copies In a following step S1102, the monitoring device obtains the detuning information $\Delta\lambda$ from the obtained information representative of signal shape of codewords received by the second device from the first device via the optical bandpass filter. To achieve this, the monitoring device compares the signal temporal shape with a set of predefined signal temporal shapes. In other words, using the illustrative example of FIG. 10, the monitoring device has at its disposal information representative of various candidate signal temporal shapes corresponding to the shapes 1010, 1020, 1030, 1040, which may be observed by the second device when receiving a symbol. Codewords being constituted by a plurality of symbols, the monitoring device may perform the comparison for one symbol among the symbols constituting the considered codeword, or may perform the comparison for plural symbols (potentially all) of the considered codeword and derives a trend for said plural symbols. In a variant, the signal temporal shaping analysis is performed on the basis of a dedicated sequence, such as a training sequence or a preamble, and the information representative of a difference level $\Delta$dec is determined on the basis of codewords transmitted consecutively to, or beforehand, said dedicated sequence. In such a case, the time difference between the dedicated sequence and said codewords is short enough to consider that the wavelength detuning has not changed in the meantime. For instance, the wavelength detuning can be considered as stable within 1 µs.

The information representative of the various candidate signal temporal shapes are actually representative of a convolution of the temporal shape of the impulse response of the optical band-pass filter shown in FIG. 10 with the waveform actually used by the first device to transmit the optical signals to the second device.

The monitoring device determines which predefined candidate shape best matches the actual shape of the received symbols. As shown in FIG. 10, knowing the signal temporal shape for the received symbol, the frequency detuning between the nominal wavelength of the optical band-pass filter and the actual carrier wavelength of the optical signal transmitted by the first device to the second device may be deduced. Such candidate shapes are for instance patterns stored in a LUT in correspondence with the frequency detuning between said nominal wavelength and said carrier wavelength.

Selecting the predefined candidate shape that provides the best match is for instance performed as follows. The monitoring device having values of the actual signal strength at predefined time intervals in the symbol duration, the monitoring device compares the actual signal strength for one interval with the signal strength estimated for the candidate shapes for the same interval. The monitoring device then selects the subset of candidate shapes for which the estimated signal strength value matches the actual signal strength for this interval, and reiterates the selection process for another interval for the selected candidate shapes, until only one candidate shape remains.

Selecting the predefined candidate shape that provides the best match may also be performed by comparing local extremes or inflection points of the actual signal shape with local extremes or inflection points of the candidate shapes.

In a following step S1103, the monitoring device obtains, from the second device, information representative of a difference level $\Delta$dec between codewords as transmitted by the first device and corresponding codewords, as effectively received by the second device and for which the signal shape information has been obtained in the step S1101. For synchronicity considerations, the step S1103 is preferably performed in parallel to the step S1101, or that the information obtained in, the step S1101 and the information obtained in the step S1103 are associated with each other.

In a following step S1104, the monitoring device provides correspondence information between the detuning information $\Delta\lambda$ and the difference level $\Delta$dec between expected codewords and effectively received codewords. Once the correspondence is established (for instance in a preliminary phase), then the monitoring device is able to later on perform the necessary carrier wavelength adjustments without analysing the signal shape.

In the context of the architecture shown on FIG. 3, the algorithm of FIG. 11 is performed by the signal shape analysing module 304, which provides the correspondence information to the detuning determining module 302. The algorithm of FIG. 11 is thus particularly adapted for filling in the already-mentioned LUT of the detuning determining module 302.

FIG. 12 schematically represents a second algorithm for determining correspondence information between the wavelength detuning information Δλ and the difference level Δdec between expected codewords and effectively received codewords. The algorithm of FIG. 12 is an alternative to the algorithm of FIG. 11.

In a step S1201, the monitoring device obtains, from the second device, results of at least one wavelength scanning operation. The wavelength scanning operation consists in the first device transmitting codewords to the second device via the optical band-pass filter for various carrier wavelengths. For instance, the set of scanned carrier wavelengths is a priori known by the monitoring device, or provided by the first device directly or indirectly to the monitoring device. As already mentioned, effective carrier wavelengths may not be known and only information representative of said carrier wavelengths is used, such as configuration parameters of the optical transmission interface of the first device. The second device performs signal strength measurements of the received codewords. In other words, the second device obtains attenuation measurements for the various scanned carrier wavelengths and provides said measurements, or information representative thereof, to the monitoring device. An illustrative example of said measurements is shown in FIG. 13A. In FIG. 13A, each measurement is represented by a cross (x), wherein frequency is represented as abscissa (horizontal axis) and measured signal strength (denoted S on FIG. 13A) is represented as ordinate (vertical axis).

The wavelength scanning operation may be reiterated to obtain plural measurements per value of carrier wavelength, which would define a range of measured attenuation values per value of carrier wavelength.

In a following step S1202, the monitoring device adjusts a predefined attenuation model of the optical band-pass filter onto the results of the wavelength scanning operation(s). In other words, the monitoring device tries to match the predefined attenuation model of the optical band-pass filter onto the results of the wavelength scanning operation(s).

It has to be noticed that the passband value of the optical band-pass filter (width 2ε when referring to FIG. 2) is typically independent of the temperature variations. Therefore, the global shape of the attenuation model (as shown on FIG. 2) of the optical band-pass filter may be a priori known, although the nominal wavelength $f_0$ of the passband is a priori unknown. An illustrative example is shown in FIG. 13B, on the basis of the measurements shown in FIG. 13A. The nominal wavelength $f_0$, or the corresponding configuration of the optical transmission interface of the first device, can therefore be determined, e.g. estimated by interpolation if necessary, by the monitoring device.

In a following step S1203, the monitoring device obtains, from the second device, information representative of a difference level Δdec between codewords as transmitted by the first device and corresponding codewords, as effectively received by the second device and for which the measurements, or information representative thereof, has been obtained in the step S1201. For synchronicity considerations, the step S1203 is preferably performed in parallel to the step S1201, or that the information obtained in the step S1201 and the information obtained in the step S1203 are associated with each other.

In a following step S1204, the monitoring device provides correspondence information between the detuning information Δλ and the difference level Δdec between expected codewords and effectively received codewords. The detuning information Δλ, corresponds to the difference between the nominal wavelength $f_0$ of the passband and the carrier wavelength corresponding to the considered difference level Δdec. Once the correspondence is established (for instance in a preliminary phase), then the monitoring device is able to later on perform the necessary carrier wavelength adjustments without having to perform again wavelengths scanning.

In the context of the architecture shown on FIG. 3, the algorithm of FIG. 12 is performed by the already-mentioned attenuation analysing module, which is adapted to provide the correspondence information to the detuning determining module 302. The algorithm of FIG. 12 is thus particularly adapted for filling in the already-mentioned LUT of the detuning determining module 302.

The invention claimed is:

1. A method for determining whether a configuration of an optical transmission interface of a first device has to be adjusted for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, the method comprising:
   monitoring an evolution of a difference level between codewords received by the second device via said optical signals and corresponding codewords transmitted by the first device; and
   determining whether the configuration of the optical transmission interface of the first device has to be adjusted regarding said carrier wavelength so as to match the passband of the optical band-pass filter, on the basis of said monitoring;
   detecting discontinuities in the evolution of the difference level between said codewords received by the second device and said corresponding codewords transmitted by the first device; and
   extracting a continuous and monotonic evolution of said difference level by removing said discontinuities.

2. The method according to claim 1, the method further comprising:
   obtaining a first difference level between first codewords received by the second device and corresponding first codewords transmitted by the first device;
   obtaining a second difference level between second codewords received by the second device and corresponding second codewords transmitted by the first device; and
   detecting one said discontinuity when a difference between said first difference level and said second difference level is greater than a first threshold.

3. The method according to claim 2, wherein said first and second difference levels respectively correspond to plural difference levels, between codewords received by the second device and corresponding codewords transmitted by the first device, integrated over an integration period.

4. The method according to claim 2, wherein the first and second devices implementing a forward error correction scheme, a refreshing period separating the obtaining of said first difference level and the obtaining of said second difference level, the monitoring device temporarily reduces said refreshing period, when a difference between the second difference level and a decoding limit, which corresponds to the maximum difference level beyond which the second device is unable to recover codewords as transmitted by the first device according to the forward error correction scheme, is below than a second threshold.

5. A method for determining whether a configuration of an optical transmission interface of a first device has to be adjusted for transmitting optical signals to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, the method comprising:
    monitoring an evolution of a difference level between codewords received by the second device via said optical signals and corresponding codewords transmitted by the first device;
    determining whether the configuration of the optical transmission interface of the first device has to be adjusted regarding said carrier wavelength so as to match the passband of the optical band-pass filter, on the basis of said monitoring;
    determining an accumulated amount of variation of the difference level; and
    determining detuning information representative of a mismatch between the carrier wavelength and the passband of the optical band-pass filter, on the basis of said accumulated amount of variation and of a list of correspondence between detuning information and respective accumulated amounts of variation of the difference level,
    wherein the monitoring device determines beforehand said list of correspondence between detuning information and respective accumulated amounts of variation of the difference level by analysing signal temporal shapes of codeword symbols received by the second device from the first device via the optical band-pass filter.

6. The method according to claim 5, wherein the monitoring device compares said signal temporal shapes with information representative of a set of predefined signal temporal shapes.

7. The method according to claim 5, wherein the monitoring device determines beforehand said list of correspondence between detuning information and respective accumulated amounts of variation of the difference level by:
    obtaining information representative of signal strength measurements for codewords received by the second device from the first device via the optical band-pass filter, for various carrier wavelengths;
    obtaining information representative of the difference level between said codewords and expected codewords;
    trying to match a predefined attenuation model of the optical band-pass filter onto the signal strength measurements; and
    determining the list of correspondence between detuning information and respective accumulated amounts of variation of the difference level, on the basis of the matched predefined attenuation model and the obtained difference level between said codewords and expected codewords.

* * * * *